Oct. 22, 1957  C. H. SCHMIDGALL  2,810,190
ABRADING TOOLS
Filed Oct. 15, 1954

INVENTOR.
Carl H. Schmidgall
BY
L. F. Hammand
Atty.

# United States Patent Office 2,810,190
Patented Oct. 22, 1957

2,810,190
ABRADING TOOLS
Carl H. Schmidgall, Peoria, Ill.

Application October 15, 1954, Serial No. 462,555

4 Claims. (Cl. 29—103)

This invention relates to abrading tools, and while the principles of the invention are applicable to hand tools, they are particularly applicable to power driven abrading wheels designed for rapid cutting of wood, metal or plastics.

It is a primary aim of the invention to provide an abrading tool which is relatively free from the faults commonly experienced with conventional cutting tools such as emery wheels, sanding discs, files, or cutting wheels of conventional tooth design, and to provide a cutting tool of unique construction such that the material being cut displays little or no tendency to stick to or clog the tool.

Another important object of the invention is to provide an abrading tool that retains its original cutting profile even after long continued use, without requiring replacement of the tool or dressing of its cutting surface.

A further object is to provide an abrading wheel having sufficient physical strength as to permit operation at speeds of rotation higher than practicable with wheels of emery, Carborundum or similar materials, so that extremely fast cutting can be accomplished.

A still further object is the provision of a cutting tool which is equally effective in either direction of rotation, so that if the wheel becomes somewhat dull after a long period of use, its usefulness may be restored by merely reversing its direction of rotation.

The foregoing objects are accomplished according to the present invention by providing a hardened metal cutting tool with the cutting surfaces of the tool pitted with a multiplicity of small, shallow pits of generally circular shape. The tool is preferably in the form of a wheel, composed of hardened tool steel. The pits are arranged in a regular or random pattern on the rim or other cutting surfaces of the wheel, as by drilling a multitude of shallow holes in these surfaces before hardening.

In the preferred form of the invention illustrated in the present drawings.

Figure 1:
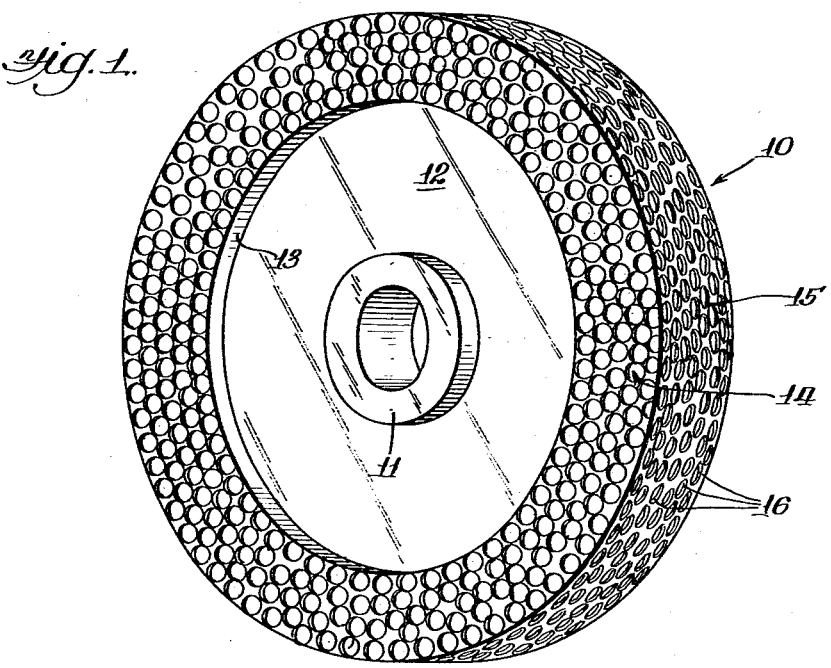
Figure 1 is a perspective view of a typical abrading wheel as contemplated by this invention.
Figure 2:
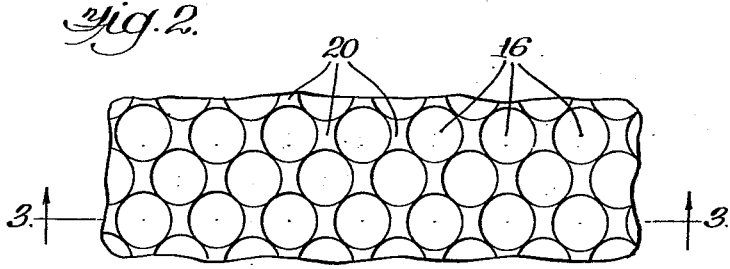
Figure 2 is an enlarged detail face view of a fragmental portion of the cutting surface of the wheel illustrated in Figure 1.
Figure 3:
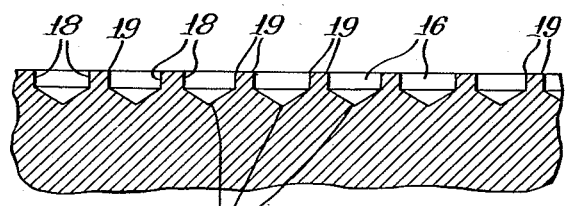
Figure 3 is a detail sectional view taken substantially on the plane of the line 3—3 of Figure 2.

As illustrated, the tool is a single, integral tool steel wheel 10 including a hub portion 11, web 12 and rim portion generally indicated as 13, which may include side cutting surfaces 14 as well as a cutting surface 15 on the wheel face. The cutting surfaces 14, 15, are formed by drilling the surfaces of the wheel as indicated in Figures 2 and 3 to form a multiplicity of shallow pits or recesses 16. As illustrated, the individual pits have tapered bottoms 17 and are drilled sufficiently deep so as to have short side wall portions 18 curved in face view but perpendicular to the surfaces of the wheel, and presenting sharp, angular cutting edges 19 in the plane of the wheel surface. For best results, the cutting area of the tool should be substantially covered with the recesses as illustrated, and the recesses should partially overlap each other, although the pits should be sufficiently spaced apart as to leave multitudes of portions 20 of the wheel surface, each bounded by sharply curved portions of the side walls 18 of the surrounding pits.

It is believed obvious from the description and illustrations of the preferred embodiment of the wheel of this invention, that it will effect an equally efficient abrading action when driven in either direction of rotation, but it has also been learned that the unique design and configuration of the cutting surface as disclosed herein results in elimination of any perceptible tendency of the wheel to allow metal to stick to or clog the cutting surface, irrespective of whether the tool is used on ferrous or non-ferrous metals. In fact, good results are obtainable even upon wood, plastic and the like.

It follows that an abrading tool according to the present invention has important advantages over emery wheels, sanding wheels or other conventional types of files and cutters, all of which display a well-recognized tendency to clog after a very short period of use. Moreover, with a tool of the present design, the surface can be designed for fine or coarse cutting merely by regulating the size and contour of the pits formed in the cutting surface. When the tool eventually becomes dull after a long period of use, its usefulness may be restored by operating it in the reverse direction to bring a new set of cutting edges into contact with the work, or the entire wheel may be easily and conveniently reconditioned by merely grinding a few thousandths of an inch of metal from its cutting surfaces to sharpen the edges 19.

Having thus described my invention, what I claim as new and desire to secure by United States Letters Patent is:

1. An abrading tool comprising a hardened steel cutting member of integral construction throughout having at least one face surface substantially covered by a multiplicity of relatively shallow circular pits; said pits having conical bottoms and parallel side walls substantially perpendicular to said face surface, and being closely spaced throughout said face surface and partially overlapping each other.

2. An abrading tool comprising a hardened steel cutting wheel of integral construction throughout having at least one rim surface substantially covered by a multiplicity of relatively shallow circular pits; said pits having conical bottoms and parallel side walls substantially perpendicular to said surface, and being closely spaced throughout said rim surface and partially overlapping each other.

3. An abrading tool comprising a hardened steel cutting wheel of integral construction throughout having the face and sides of its rim surface substantially covered by a multiplicity of relatively circular shallow pits; said pits having conical bottoms and parallel side walls substantially perpendicular to said rim surface, and being closely spaced throughout said rim surface.

4. An abrading tool comprising a hardened steel cutting member of integral construction throughout having at least one face surface substantially covered by a multiplicity of relatively shallow pits; said pits having conical bottoms and being closely spaced throughout said face surface.

References Cited in the file of this patent
UNITED STATES PATENTS

| | | |
|---|---|---|
| 1,163,867 | Shaffer | Dec. 14, 1915 |
| 1,466,391 | Eskew et al. | Aug. 29, 1923 |
| 1,576,645 | Eskew et al. | Mar. 16, 1926 |
| 1,986,850 | Pohl | Jan. 8, 1935 |
| 2,418,767 | Hall | Apr. 8, 1947 |
| 2,680,898 | Diosi | June 15, 1954 |